United States Patent
Kodou et al.

(10) Patent No.: US 9,085,127 B2
(45) Date of Patent: Jul. 21, 2015

(54) METHOD AND APPARATUS FOR CORRECTING CURLING OF FILM AND METHOD OF MANUFACTURING LAMINATED FILM

(75) Inventors: Atsushi Kodou, Kanagawa (JP); Hiroyuki Yukawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 754 days.

(21) Appl. No.: 13/344,979

(22) Filed: Jan. 6, 2012

(65) Prior Publication Data

US 2012/0175058 A1  Jul. 12, 2012

(30) Foreign Application Priority Data

Jan. 12, 2011  (JP) ................ P2011-004191

(51) Int. Cl.
*B29C 53/18* (2006.01)
*B32B 37/00* (2006.01)
*B32B 38/00* (2006.01)
*B32B 37/24* (2006.01)

(52) U.S. Cl.
CPC ............ *B32B 37/0015* (2013.01); *B29C 53/18* (2013.01); *B32B 38/164* (2013.01); *B32B 2037/243* (2013.01); *B32B 2310/04* (2013.01); *B32B 2310/0445* (2013.01); *B32B 2310/0831* (2013.01)

(58) Field of Classification Search
None
See application file for complete search history.

(56) References Cited

U.S. PATENT DOCUMENTS

2003/0096093 A1\* 5/2003 Sakamaki ............. 428/220
2011/0241255 A1\* 10/2011 Taguchi et al. .......... 264/346
2011/0241256 A1\* 10/2011 Miyachi ............... 264/346

FOREIGN PATENT DOCUMENTS

JP 2003-195051 A 7/2003

\* cited by examiner

*Primary Examiner* — Erma Cameron
(74) *Attorney, Agent, or Firm* — Birch, Stewart, Kolasch & Birch, LLP

(57) ABSTRACT

Curling of a laminated film is efficiently corrected. The water vapor is brought into contact with the base layer on the outside of the laminated film in a curled state during the first phase transition process. The glass transition temperature of the base layer is lowered. In the base layer, phase transition from the glass state to the rubber state occurs. Supply of the water vapor to the base layer is stopped in the second phase transition process. In the base layer, phase transition from the rubber state to the glass state occurs. The phase transition creates curling that can correct the original curl. The original curl can be corrected by continuously carrying out the first phase transition process and the second phase transition process. The cooling process for cooling the hard coating layer is carried out while the first phase transition process is carried out.

9 Claims, 12 Drawing Sheets

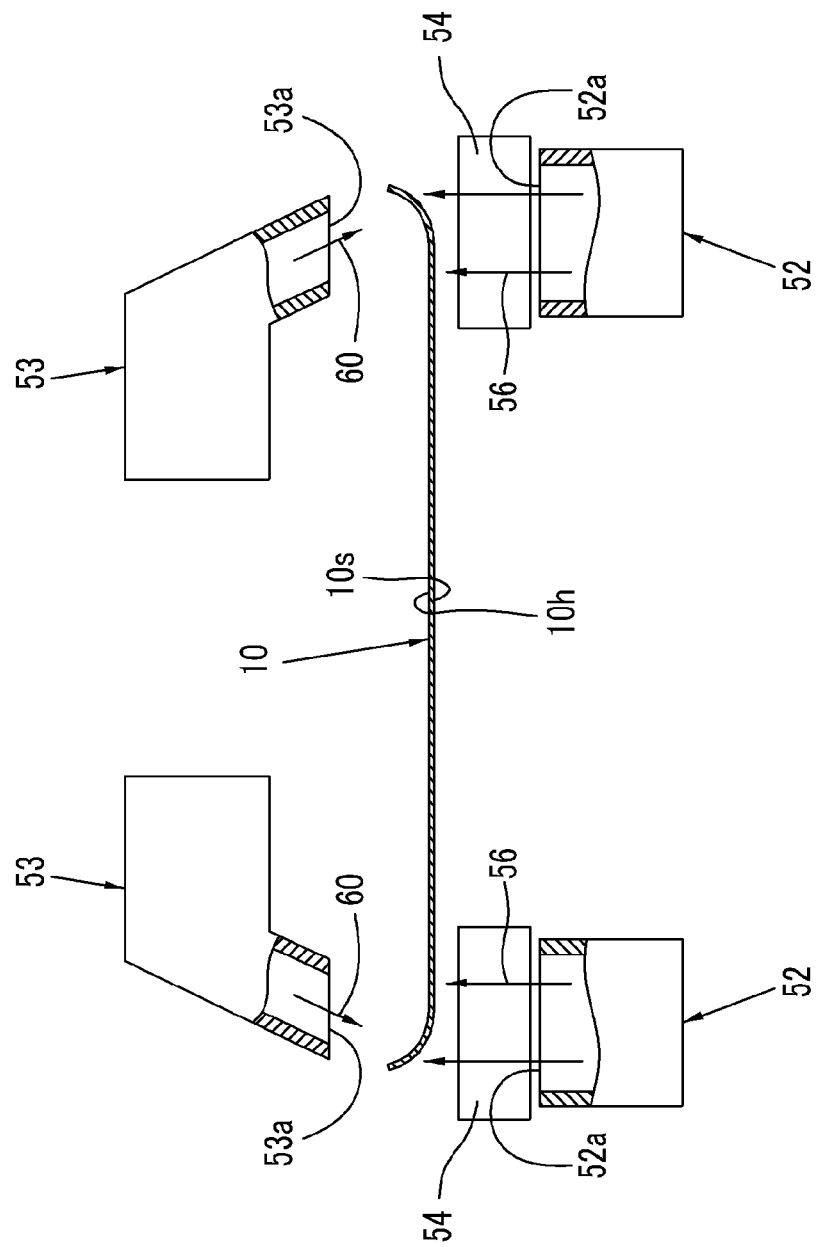

METHOD AND APPARATUS FOR CORRECTING CURLING OF FILM AND METHOD OF MANUFACTURING LAMINATED FILM

This application claims priority under 35 U.S.C. §119(a) to Japanese Application No. 2011-004191, filed in Japan on Jan. 12, 2011.

BACKGROUND OF THE INVENTION

1. Field of the Invention

The present invention relates to a method and an apparatus for correcting curling of a film and a method of manufacturing a laminated film.

2. Description of the Related Art

Among polymer films, cellulose acylate films and the like have features of excellent transparency, flexibility, and so on. There are a variety of uses for polymer films, such as a window film for being adhered to window glass, a touch panel film, an ITO base film, a membrane switch film, a 3-dimensional decoration film, an optically functional film for flat panel displays, and the like.

The above uses may include cases in which the hand, a towel, a touch pen, or the like comes into contact with or brushes the surface of the polymer film. In such cases, in order to prevent the surface of the polymer film from being damaged, a hard coating layer that is harder than the polymer film is provided on the surface of the polymer film.

An example of the method of manufacturing a polymer film having a hard coating layer on the surface will be described. Firstly, a membrane having a solvent and an ultraviolet-curing agent (hereinafter referred to as an ultraviolet-curable membrane) is formed on the surface of the polymer film (hereinafter referred to as a membrane-forming process). Next, the solvent is evaporated from the ultraviolet-curable membrane. Thirdly, the ultraviolet-curing agent included in the ultraviolet-curable membrane is polymerized by irradiation of ultraviolet rays (referred to as a polymerization process). This polymerization process enables the obtainment of a membrane including the polymer of the ultraviolet-curing agent (hereinafter referred to as a polymer membrane) from the ultraviolet-curable membrane. In this manner, a laminated film having a base layer composed of the polymer film and a hard coating layer composed of the polymer membrane can be manufactured.

However, the polymerization reaction of the ultraviolet-curing agent makes the laminated film curled so that the hard coating layer faces inward. Therefore, the curling of the laminated film was corrected by a process in which water vapor was sprayed onto the laminated film that had undergone the polymerization process (hereinafter referred to as the water vapor-contacting process) (for example, JP2003-195051A) In addition, even in a single-layer film, which is not a laminated film, there are cases in which the winding tendency, uneven distribution of the humidity and the like, and the single-layer film makes the inside and outside states of the film different, and curling occurs.

SUMMARY OF THE INVENTION

However, in order to correct curling of a manufactured laminated film, it is necessary to carry out a process in which water vapor comes into contact with the laminated film for a certain period of time. Therefore, shortening of the time period for the water vapor-contacting process is required in order to improve the production efficiency.

In the case of mass production of laminated films, a membrane-forming process, a drying process, a polymerization process, and the water vapor-contacting process are sequentially carried out on a band-shaped base film that is transported at a predetermined rate. In addition, as the transportation rate of the base film is increased (for example, 20 m/minute or more), a water vapor-contacting apparatus for carrying out the water vapor-contacting process needs to be installed long in the transportation direction.

JP2003-195051A does not describe a method for shortening the time for the water vapor-contacting process. As such, with the method as described in JP2003-195051A, improvement in the production efficiency of the laminated film and space-saving of an apparatus for correcting curling of the laminated film can not be achieved together.

The present invention has been made in view of the above-mentioned problems and an object of the present invention is to provide a method and an apparatus for correcting curling of a single-layer film or laminated film, and a method of manufacturing a laminated film.

The method for correcting curling of a film of the present invention has a first phase transition process in which vapor having a higher temperature than the outside surface is brought into contact with the outside surface until the outer layer in a glass state, which is exposed to the outside surface of the film in a curled state, is turned into a rubber state, a second phase transition process in which the contact of the vapor is stopped until the outer layer in the rubber state is turned into a glass state, and a cooling process in which the inside surface of the curled film is cooled while the first phase transition process is carried out. Here, the outside surface of the film in a curled state refers to a surface that is intended to be shrunk in order to correct curling, and the inside surface refers to a surface on the opposite side of the outside surface. In addition, when the amount of vapor included in an atmosphere per unit volume in the vicinity of the outside surface having a temperature of Tf1 is Va, and the amount of saturated vapor having a temperature of Tf1 in an atmosphere per unit volume is Vs, the cooling is preferably carried out so as to suppress a decrease in the vapor concentration as indicated by Va/Vs.

When the glass transition temperature of a substance that composes the outer layer is Tg, the cooling is preferably carried out so that |Tf1−Tg| in the first phase transition process is decreased. In addition, the cooling is preferably carried out when the outer layer is in a rubber state.

The cooling may be carried out by blowing a gas having a temperature lower than the temperature Tf1 against the inside surface, and the cooling may be carried out by bringing rollers having a temperature lower than the temperature Tf1 into contact with the inside surface.

It is preferable that the film have a web shape, the film be curled in the width direction, and the cooling be carried out at the end portions in the width direction of the web. In addition, the film is preferably formed of a material that can absorb the substance that composes the vapor. Furthermore, the vapor is preferably water vapor.

The method of manufacturing a laminated film of the present invention has a membrane-forming process in which a membrane composed of monomers is formed onto a film, a polymerization process in which polymerized membranes are overlapped on the film by polymerization of the monomers so as to obtain a laminated film, and a curling correcting process in which curling occurring in the laminated film due to the polymerization process is corrected, in which the above method for correcting curling of a film is carried out in the curling correcting process.

The apparatus for correcting curling of a film of the present invention has a vapor-supplying section for bringing vapor having a higher temperature than the outside surface into contact with the outside surface of the film in a curled state, a cooling section for cooling the inside surface of the film, a vapor-supplying control section for controlling starting and stopping of the supply of vapor by the vapor-supplying section, and a cooling control section for controlling starting and stopping of the cooling by the cooling section, in which the vapor-supplying control section supplies vapor to the outside surface until the outer layer in a glass state, which is exposed to the outside surface, is turned into a rubber state, and stops the supply of vapor until the outer layer in the rubber state is again turned into a glass state, and the cooling control section carries out the cooling of the inside surface while vapor comes into contact with the outside surface. In addition, when the amount of vapor included in an atmosphere per unit volume in the vicinity of the outside surface having a temperature of Tf1 is Va, and the amount of saturated vapor having a temperature of Tf1 in an atmosphere per unit volume is Vs, the cooling control section preferably carries out the cooling so as to suppress a decrease in the vapor concentration as indicated by Va/Vs.

When the glass transition temperature of a substance that composes the outer layer is Tg, the cooling control section preferably carried out the cooling of the inside surface so that |Tf1−Tg| is decreased when vapor comes into contact with the outside surface. In addition, the cooling control section preferably starts the cooling of the inside surface out when the outer layer is in a rubber state.

The cooling section may blow a cold gas having a temperature lower than the inside surface against the inside surface, and bring cooling rollers having a lower temperature than the inside surface into contact with the inside surface.

It is preferable that the film have a web shape, the film be curled in the width direction, and the cooling be carried out at the end portions in the width direction of the web.

According to the present invention, since the cooling process in which the inside surface is cooled, is carried out while the first phase transition process, in which a gas including vapor is brought into contact with the outside surface of a film in a curled state and the outer layer in a glass state exposed to the outside surface is made to enter a rubber state, is carried out, the curling can be corrected within a short time. Therefore, according to the present invention, it is possible to achieve both improvement in the production efficiency of laminated film and space-saving of an apparatus for correcting curling of the laminated film.

BRIEF DESCRIPTION OF THE DRAWINGS

FIG. 4 is a cross-sectional view showing the outlines of the water vapor-supplying unit and the cooling gas-supplying unit.

FIG. 5 is an explanatory view showing an appearance in which curling of the laminated film is corrected by the first phase transition process and the second phase transition process.

DESCRIPTION OF THE PREFERRED EMBODIMENTS

Figure 1:
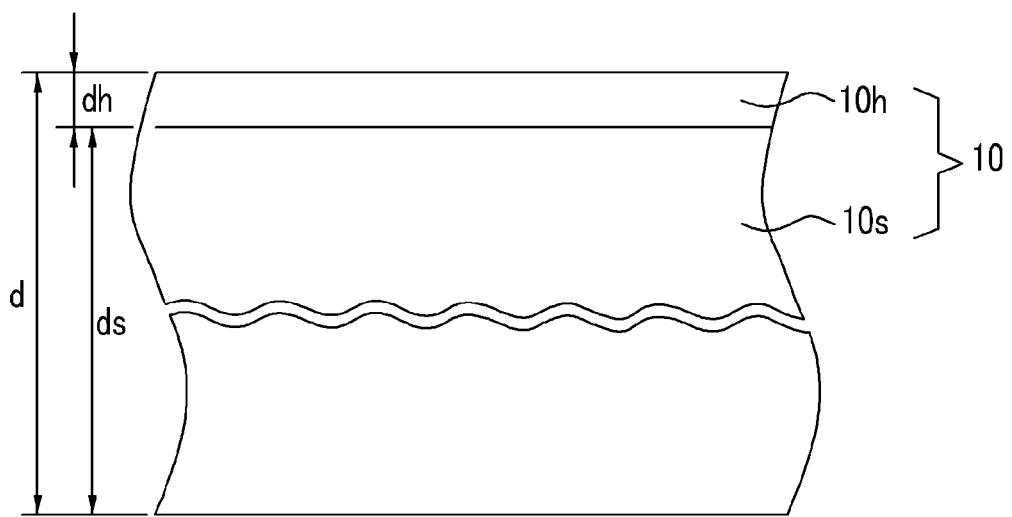
FIG. 1 is a side view showing the outline of the laminated film.

As shown in FIG. 1, a laminated film 10 has a base layer 10s and a hard coating layer 10h that is overlapped on the base layer 10s and harder than the base layer 10s. The thickness d of the laminated film 10 is not particularly limited, but is preferably 5 μm to 120 μm, and more preferably 20 μm to 100 μm. The ratio dh/ds of the thickness dh of the hard coating layer 10h to the thickness ds of the base layer 10s is preferably, for example, 0.04 to 0.50, and more preferably 0.10 to 0.40.

Figure 2:
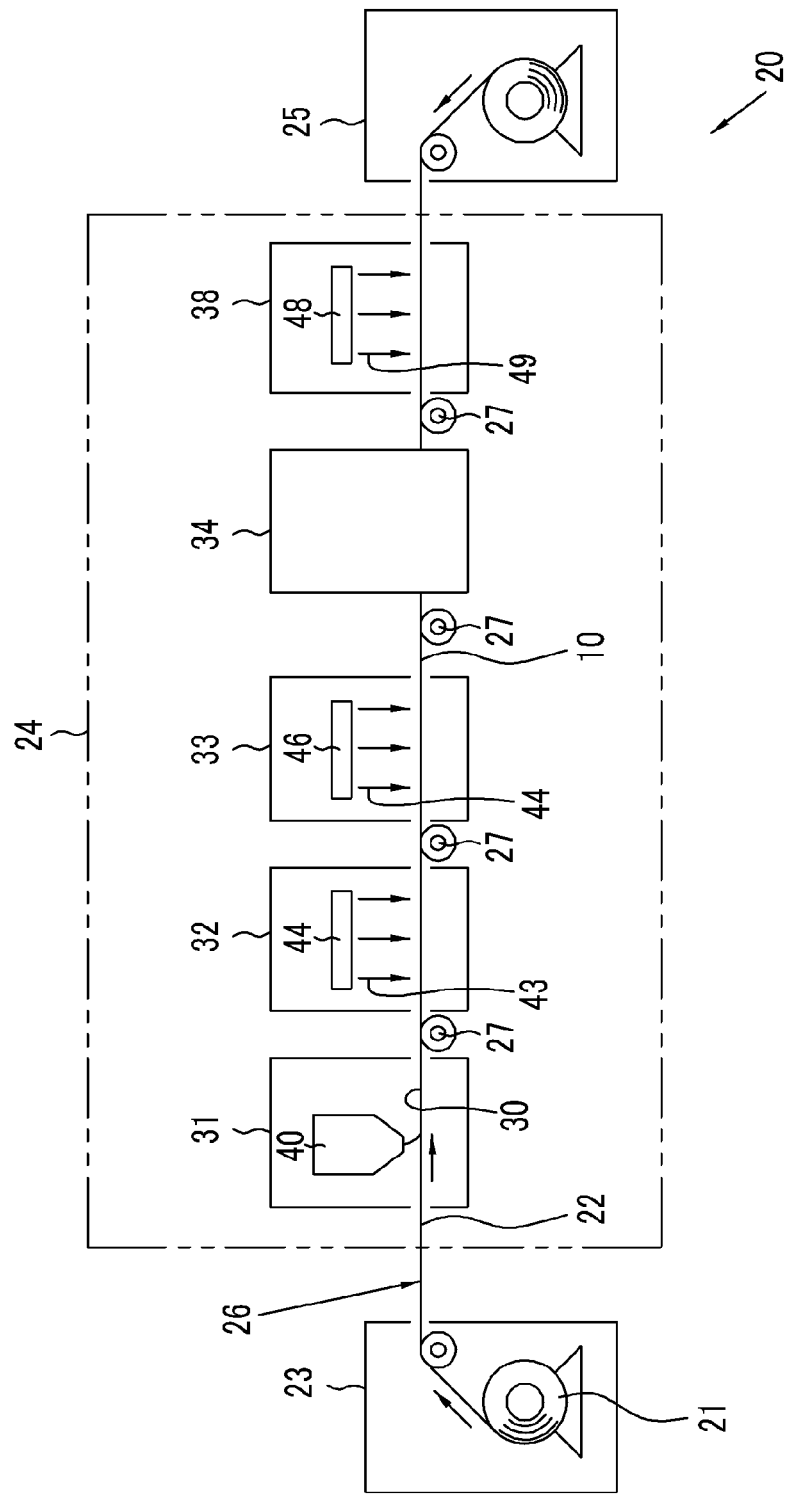
FIG. 2 is an explanatory view showing the outline of the laminated film-manufacturing facilities.

The laminated film 10 is manufactured using a laminated film-manufacturing facility 20 as shown in FIG. 2. The laminated film-manufacturing facility 20 has a unwinding section 23 for delivering a band-shaped base film 22 from a roll-shaped base film (hereinafter referred to as a base film roll) 21, a manufacturing unit 24 for making the laminated film 10 using the base film 22, and a winding section 25 for winding the laminated film 10 around a core in a roll shape.

A transportation path 26 is formed between the unwinding section 23 and the winding section 25 so as to pass through the manufacturing unit 24. A plurality of web handling rollers 27 are arranged along the transportation path 26 from the unwinding section 23 toward the winding section 25.

A material for forming the base film 22 is not particularly limited, but preferably a polymer. Examples of the polymer include cellulose acylates, circular polyolefin, lactone ring-containing polymers, polycarbonates, and the like. The details of cellulose acylates will be described below. When the laminated film 10 is used for an optical use, the base film 22 is preferably formed of a light-permeable material.

The manufacturing unit 24 includes a membrane-forming apparatus 31 for forming a membrane 30 on the base film 22, a membrane-drying apparatus 32 for drying the membrane 30, an irradiation apparatus 33 for irradiating predetermined ultraviolet rays to the membrane 30, and a curling correction apparatus 34 for correcting curling of the laminated film 10 made by irradiation of ultraviolet rays, which are provided sequentially from the unwinding section 23 toward the winding section 25. Meanwhile, a film-drying apparatus 38 for drying the laminated film 10 may be provided between the curling correction apparatus 34 and the winding section 25.

The membrane-forming apparatus 31 has a die 40 for allowing a coating fluid to flow out. The die 40 coats the coating fluid on the surface of the base film 22. The coating of the coating fluid forms the membrane 30 composed of the coating fluid on the surface of the base film 22. The coating fluid is manufactured by dissolving or dispersing in a colloid shape an ultraviolet-curable material in an appropriate solvent. The concentration of the ultraviolet-curable material is appropriately selected according to use; however, in general, the concentration is preferably 10% by mass to 95% by mass.

Examples of the ultraviolet-curable material that is preferably used include ionizing radiation-curable multifunctional monomers and multifunctional oligomers. The functional group of the ionizing radiation-curable multifunctional monomer or multifunctional oligomer is preferably a light, electron ray, or radioactive ray-polymerizable functional group, but a light-polymerizable functional group is preferred among them. The light-polymerizable functional group includes unsaturated polymerizable functional groups, such as (meth)acryloyl groups, vinyl groups, styryl groups, and aryl groups, and the like, and (meth)acryloyl groups are preferred.

The solvent is preferably a compound that does not dissolve the substance that forms the base film 22. In addition, a compound that swells the substance that forms the base film 22 is preferred in order to improve the adhesiveness between the base layer 10s and the hard coating layer 10h in the laminated film 10. Furthermore, the solvent is not particularly limited as long as the ultraviolet-curable material is dissolved or dispersed uniformly without causing sedimentation, and two or more solvents can be used together.

Preferred examples of the solvent include alcohols, ketones, esters, amides, ethers, ether esters, hydrocarbons, halogenated hydrocarbon, and the like as the dispersive medium. Specific examples include alcohols (for example, methanol, ethanol, propanol, butanol, benzyl alcohol, ethylene glycol, propylene glycol, ethylene glycol monoacetate, and the like), ketones (for example, methyl ethyl ketone, methyl isobutyl ketone, cyclohexane, methyl cyclohexane, and the like), esters (for example, methyl acetate, ethyl acetate, propyl acetate, butyl acetate, ethyl formate, propyl formate, butyl formate, ethyl lactate, and the like), aliphatic hydrocarbons (for example, hexane and cyclohexane), halogenated hydrocarbons (for example, methylene chloride, methyl chloroform, and the like), aromatic hydrocarbons (for example, toluene, xylene, and the like), amides (for example, dimethyl formamide, dimethyl aceteamide, n-methyl pyrrolidone, and the like), ethers (for example, dioxane, tetrahydrofuran, ethylene glycol dimethyl ester, propylene glycol dimethyl ether, and the like), ether alcohols (for example, 1-methoxy-2-propanol, ethyl cellosolve, methylcarbinol, and the like), and fluoroalcohols (for example, the compounds as described in paragraph number [0020] in JP1996-143709A (JP-H8-143709A), paragraph number [0037] in JP2001-60807A (JP-H11-60807A), and the like).

These solvents can be used singly or as a mixture of two or more. Preferred solvents include toluene, xylene, methyl ethyl ketone, methyl isobutyl ketone, cyclohexane, methanol, isopropanol, and butanol. In addition, a coating solvent system dominated by ketone solvents (for example, methyl ethyl ketone, methyl isobutyl ketone, cyclohexanone, and the like) is also preferably used, and the content of the ketone-based solvent is preferably 10% by mass or more of the entire solvent included in a curable composition, and more preferably 30% by mass or more.

The membrane-drying apparatus 32 has a dry wind supplier 44 for blowing dry wind 43 against the membrane 30. The irradiation apparatus 33 has an ultraviolet ray irradiator 46 for irradiating ultraviolet rays to the membrane 30. The ultraviolet ray irradiator 46 has a light source for generating ultraviolet rays. Examples of the light source that can be used to generate ultraviolet rays include a low-pressure mercury lamp, a medium-pressure mercury lamp, a high-pressure mercury lamp, an ultrahigh-pressure mercury lamp, a carbon-arc lamp, a metal halide lamp, a xenon lamp, and the like.

The curling correction apparatus 34 corrects curling of the laminated film 10. The details of the curling correction apparatus 34 will be described below. The film-drying apparatus 38 has a dry wind supplier 48 for blowing dry wind 49 against the laminated film 10. Contact with the dry wind 49 evaporates water, the solvent, and the like included in the laminated film 10.

(Curling Correction Apparatus)

Figure 3:
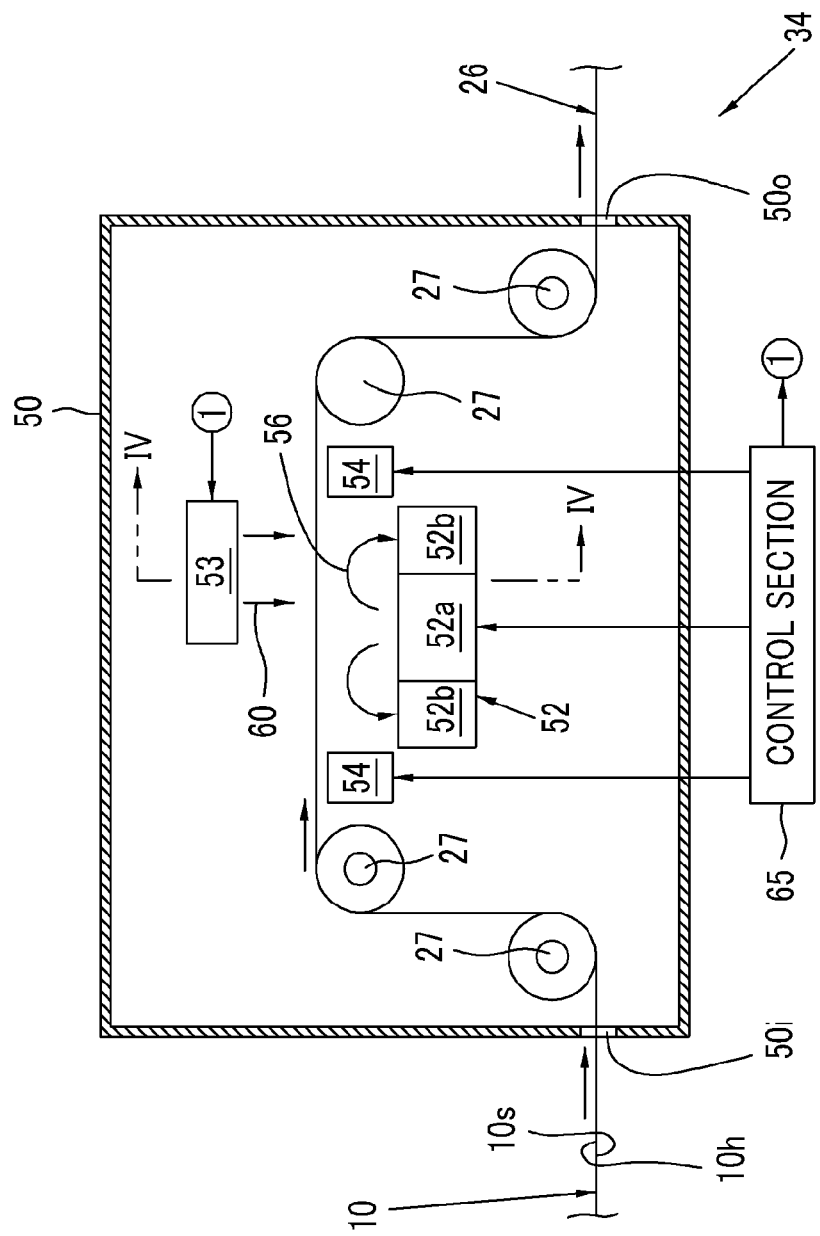
FIG. 3 is a side view showing the outline of the first curling correction apparatus.

As shown in FIGS. 3 and 4, the curling correction apparatus 34 has a water vapor contact casing 50 having an inlet 50i and an outlet 50o. The web handling rollers 27 are arranged in the water vapor contact casing 50 from the inlet 50i toward the outlet 50o. In this manner, a transportation path 26 is formed in the water vapor contact casing 50 from the inlet 50i toward the outlet 50o.

A water vapor-supplying unit 52, a cooling gas-supplying unit 53, and sensor units 54 are provided in the water vapor contact casing 50. The water vapor-supplying unit 52 (water vapor-supplying section) is provided on one side of the transportation path 26, and the cooling gas-supplying unit 53 (cooling section) is provided on the other side of the transportation path 26. The sensor units 54 are arranged along the transportation path 26 from the upper stream side to the lower stream side of the water vapor-supplying unit 52.

(Water Vapor-Supplying Unit)

The water vapor-supplying unit 52 has delivery openings 52a for delivering water vapor 56 and intake openings 52b for intaking the water vapor 56. The water vapor-supplying unit 52 is disposed so that the delivery openings 52a face the base layer 10s of the laminated film 10 that is transported through the transportation path 26. In addition, the water vapor-supplying unit 52 is preferably disposed between the neighboring web handling rollers 27. The intake openings 52b are preferably provided on the upper stream side and the lower stream side of the delivery opening 52a in the transportation direction. Meanwhile, the absorption opening 52b may be provided on either the upper stream side or the lower stream side of the delivery opening 52a in the transportation direction.

(Cooling Gas-Supplying Unit)

The cooling gas-supplying unit 53 has a delivery opening 53a for delivering cooling gas 60. The cooling gas-supplying unit 53 is disposed so that the delivery opening 53a faces the hard coating layer 10h of the laminated film 10 that is transported through the transportation path 26. Meanwhile, the cooling gas-supplying unit 53 may be provided with an absorption opening for intaking the cooling gas 60.

The water vapor-supplying unit 52 is preferably provided so that the delivery openings 52*a* face both end portions in the width direction of the base layer 10*s*. In addition, the cooling gas-supplying unit 53 is preferably provided so that the delivery openings 53*a* face both end portions in the width direction of the hard coating layer 10*h*.

The sensor unit 54 has a temperature sensor for detecting the temperature Tf1 of the base layer 10*s* and a humidity sensor for detecting the absolute humidity, that is, the water vapor amount Va in the nearby atmosphere of the base layer 10*s*. Examples of the temperature sensor that can be used include an infrared temperature sensor and the like. Examples of the humidity sensor that can be used include an infrared humidity sensor and the like.

The control section 65 scans the temperature Tf1 and water vapor amount Va of the base layer 10*s* from the sensor unit 54. The control section 65 has the functions of a vapor-supplying control section and a cooling control section, controls the starting and stopping of supply of the water vapor 56 by the water vapor-supplying unit 52 or controls the starting and stopping of the supply of the cooling gas 60 by the cooling gas-supplying unit 53 based on the temperature Tf1 and the water vapor amount Va. Furthermore, the control section 65 appropriately adjusts the temperature and the like of the water vapor 56 supplied by the water vapor-supplying unit 52 or the temperature and the like of the cooling gas 60 supplied by the cooling gas-supplying unit 53.

(Water Vapor)

The water vapor 56 may be any of saturated vapor and overheated vapor. When the boiling point of water is indicated by BP, the temperature TB of the water vapor 56 is preferably, for example, BP ° C. to (BP+20) ° C. In addition, the temperature TB of the water vapor 56 is preferably higher by α than the glass transition temperature of the substance that forms the base layer 10*s*, which is lowered due to the contact with the water vapor 56. Here, α is 60° C. or lower. This is because, when α exceeds 60° C., it becomes difficult to maintain a sufficient amount of moisture in the base layer 10*s* in order to turn the glass state of the base layer 10*s* into the rubber state, and therefore phase transition from the glass state to the rubber state becomes difficult.

(Cooling Gas)

The cooling gas 60 may be air or an inert gas. The temperature TA of the cooling gas 60 is lower than the temperature Tf1, and is lower than the temperature TB of the water vapor 56. The value of (TB−TA) is preferably 0° C. to 50° C.

The action of the present invention will be described. As shown in FIG. 2, the unwinding section 23 delivers the base film 22 to the transportation path 26 in the laminated film-manufacturing facility 20. The base film 22 is made into the laminated film 10 by the manufacturing unit 24, and sent to the winding section 25. The winding section 25 winds the laminated film 10 around the core.

Next, the details of the manufacturing unit 24 will be described. The membrane-forming apparatus 31 forms the membrane 30 on the surface of the base film 22. The membrane-drying apparatus 32 blows the dry wind 43 against the membrane 30 so as to evaporate the solvent from the membrane 30. The irradiation apparatus 33 irradiates ultraviolet rays to the membrane 30. Irradiation of ultraviolet rays polymerizes the ultraviolet-curable material. The polymerization of the ultraviolet-curable material turns the membrane 30 into the hard coating layer 10*h* (refer to FIG. 1). In this manner, the laminated film 10 having the base layer 10*s* composed of the base film 22 (refer to FIG. 1) and the hard coating layer 10*h* (refer to FIG. 1) is manufactured.

Figure 5A:
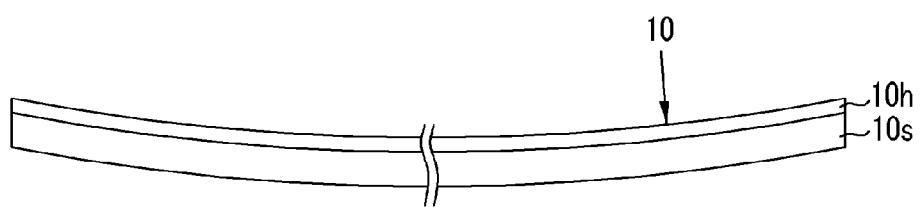
FIG. 5A shows the outline of the laminated film in a curled state before the first phase transition process.

As a result of the reduction in volume of the ultraviolet-curable material caused by polymerization thereof, a first internal stress is generated in the laminated film 10. In addition, the generation of the first internal stress causes the hard coating layer 10*h* to be curled inward (refer to FIG. 5A) In this case, since it is necessary to shrink the base layer 10*s* side in order to correct the curling of the film, the base layer 10*s* side becomes the outside surface of the film, and the hard coating layer 10*h* side on the opposite side of the base layer 10*s* becomes the inside surface of the film. In order to correct the curling caused in the laminated film 10, a first phase transition process 71 and a second phase transition process 72 are continuously carried out in a water vapor contact casing 50 as shown in FIG. 3 (refer to FIG. 6).

(First Phase Transition Process)

Figure 5B:
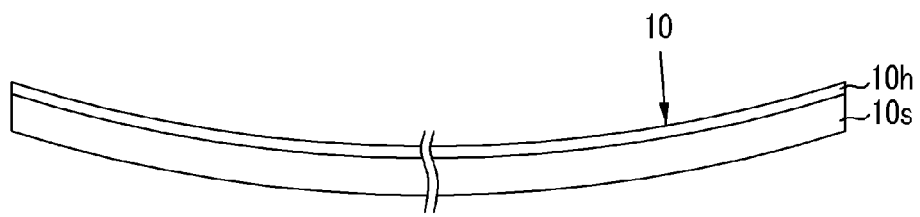
FIG. 5B shows the laminated film during the first phase transition process.
Figure 6:
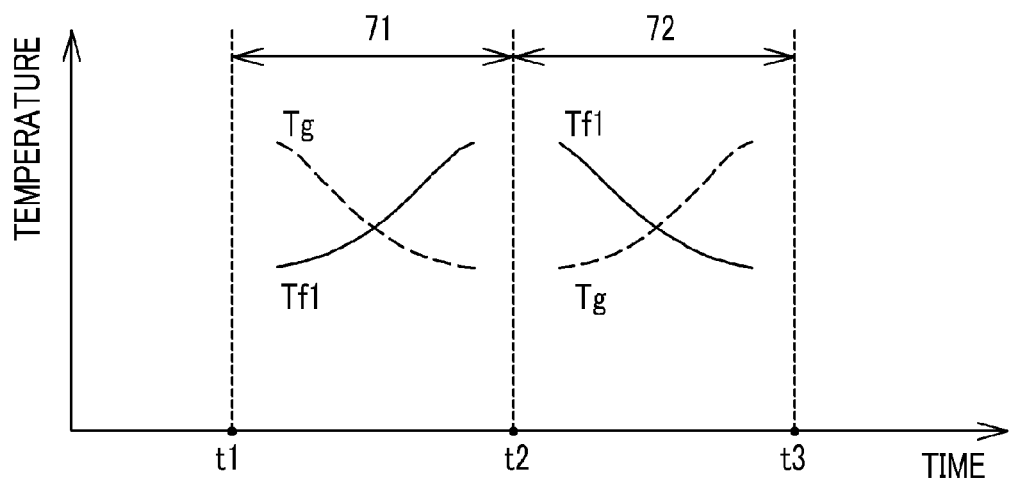
FIG. 6 is a graph showing the shift of the temperature Tf1 (solid line) and the temperature Tg (broken line) when the cooling process is not carried out, and the first phase transition process and the second phase transition process are carried out, in which the horizontal axis indicates the time, and the vertical axis indicates the temperature.

In the first phase transition process 71 that is carried out from a time t1 through a time t2, the water vapor-supplying unit 52 blows the water vapor 56 against the base layer 10*s* of the laminated film 10 in the curled state under the control of the control section 65 (refer to FIGS. 3 and 4). Since the contact with the water vapor 56 increases the water content of the base layer 10*s*, the glass transition temperature Tg (broken line) of the base layer 10*s* is lowered as shown in FIG. 6. In addition, when the glass transition temperature Tg (broken line) is below the temperature Tf1 (solid line) of the base layer 10*s*, a phase transition from a glass state to a rubber state (hereinafter referred to as a first phase transition) occurs in the base layer 10*s* (refer to FIG. 5B). Meanwhile, the first phase transition may occur across the entire base layer 10*s* or only at the surface layer of the base layer 10*s*. In addition, the time t2 may be a point in time when the first phase transition occurs or after the first phase transition.

(Second Phase Transition Process)

In the second phase transition process 72 that is carried out from the time t2 through a time t3, the water vapor-supplying unit 52 stops the supply of the water vapor 56 to the base layer 10*s* under the control of the control section 65. Thereby, the water content at the base layer 10*s* is lowered, and therefore the glass transition temperature Tg (broken line) of the base layer 10*s* is increased as shown in FIG. 6. In addition, when the glass transition temperature Tg (broken line) is above the temperature Tf1 (solid line) of the base layer 10*s*, a phase transition from the rubber state to the glass state (hereinafter referred to as a second phase transition) occurs in the base layer 10*s*.

Figure 5C:
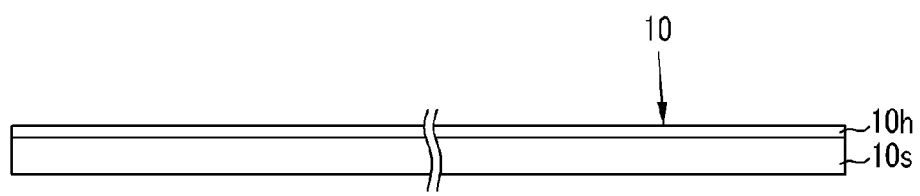
FIG. 5C shows the laminated film after the second phase transition process.

During the second phase transition, shrinkage of the base layer 10*s* occurs. As a result of the shrinkage of the base layer 10*s*, a second internal stress is generated in the base layer 10*s*. The second internal stress can offset the original curl. As such, due to the first phase transition process 71 in which the water vapor 56 is brought into contact with the base layer 10*s* until the first phase transition occurs and the second phase transition process 72 in which the water vapor 56 is separated from the base layer 10*s* until the second phase transition occurs, the second internal stress is generated, and the original curl can be corrected (refer to FIG. 5C).

In order to generate the second internal stress, during the first phase transition process 71, the glass transition temperature Tg of the base layer 10*s* needs to become lower than the temperature Tf1 of the base layer 10*s*, and it is necessary to absorb the water vapor 56 in the base layer 10*s* until the base layer 10*s* turns into the rubber state from the glass state. Furthermore, the absorption amount KR of the water vapor 56 in the base layer 10*s* per unit time period is increased as the water vapor consistency X in the base layer 10s is increased, and is decreased as the water vapor consistency X in the base layer 10s is decreased.

Here, the water vapor consistency X in the base layer 10s is the water vapor amount Va per unit volume, which is included in the nearby atmosphere of the base layer 10s at a temperature of Tf1, divided by the saturated water vapor amount Vs of the atmosphere at temperature Tf1 per unit volume, and computed by the control section 65. The method of computing the water vapor consistency X in the base layer 10s is, for example, as follows: Firstly, the control section 65 scans the temperature Tf1 of the base layer 10s and the water vapor amount Va included in the nearby atmosphere of the base layer 10s from the sensor unit 54. Next, the control section 65 computes the saturated water vapor amount Vs at temperature Tf1. Finally, the control section 65 divides the water vapor amount Va by the saturated water vapor amount Vs, and thus can obtain the water vapor consistency X in the base layer 10s.

Figure 7:
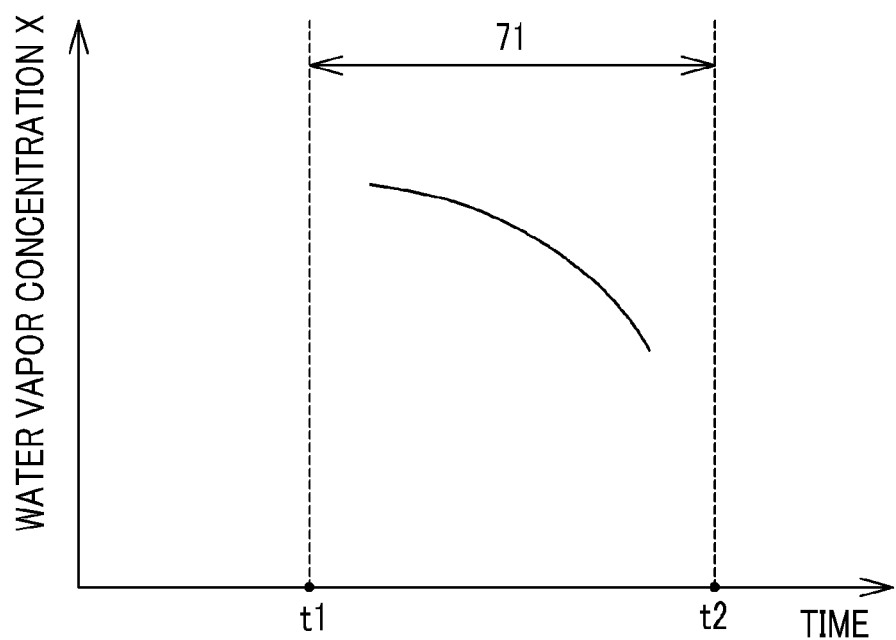
FIG. 7 is a graph showing the shift of the water vapor consistency X in the first phase transition process, in which the horizontal axis indicates the time, and the vertical axis indicates the water vapor consistency X.

During the first phase transition process 71, the water vapor 56 is brought into contact with the base layer 10s in order to absorb a predetermined amount of water vapor 56 in the base layer 10s. In addition, the temperature of the water vapor 56 is higher than the temperature Tf1 of the base layer 10s. Therefore, during the first phase transition process 71, the heat energy of the water vapor 56 is accumulated in the laminated film 10, and therefore the temperature Tf1 of the base layer 10s is increased. Meanwhile, the water vapor amount Va in the nearby atmosphere of the base layer 10s is substantially constant. As such, during the first phase transition process 71, the water vapor consistency X is lowered as time passes (refer to FIG. 7), and therefore the absorption amount KR of the water vapor 56 in the first phase transition process 71 is decreased.

(Cooling Process)

Figure 8:
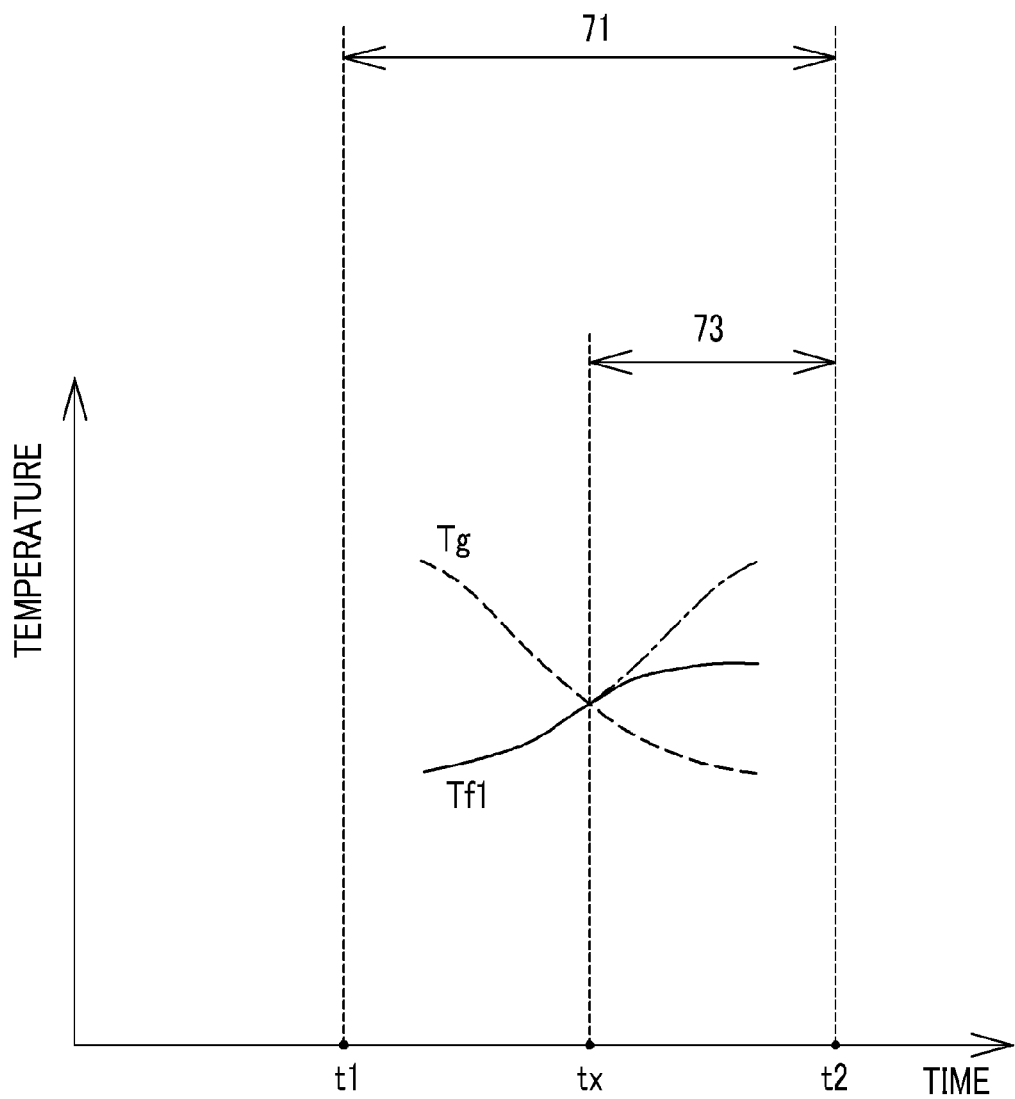
FIG. 8 is a graph showing the shift of the temperature Tf1 (solid line) and the temperature Tg (broken line) when the cooling process is carried out in the first phase transition process, and the shift of the temperature Tf1 (two-dot chain line) when the cooling process is not carried out in the first phase transition process, in which the horizontal axis indicates the time, and the vertical axis indicates the temperature.
Figure 9:
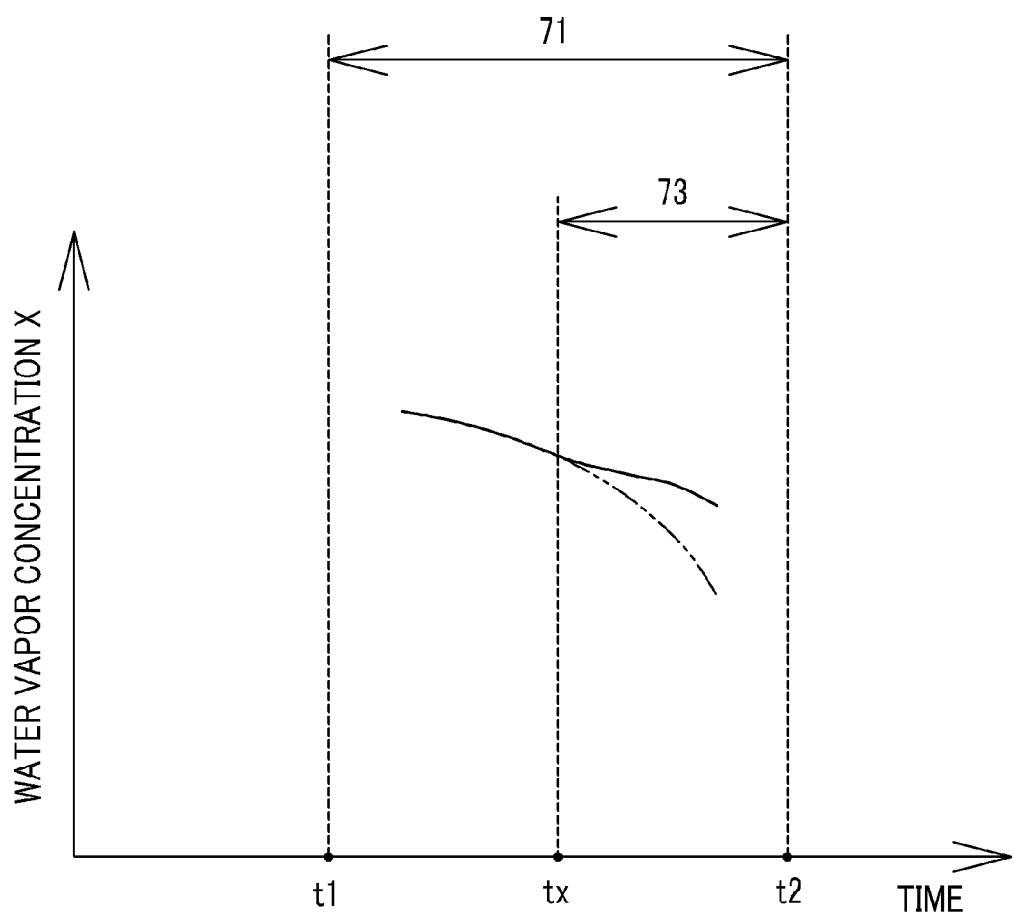
FIG. 9 is a graph showing the shift of the water vapor consistency X (solid line) when the cooling process is carried out in the first phase transition process, and the shift of the water vapor consistency X (two-dot chain line) when the cooling process is not carried out in the first phase transition process, in which the horizontal axis indicates the time, and the vertical axis indicates the water vapor consistency X.

In the present invention, a cooling process 73 is carried out during the time period in which the first phase transition process 71 is carried out as shown in FIG. 8. In the cooling process 73, the cooling gas-supplying unit 53 blows the cooling gas 60 against the hard coating layer 10h, and cools the hard coating layer 10h. In addition, the cooling process 73 can lower the temperature Tf1 (solid line) to lower than the temperature Tf1 (two-dot chain line) in a case in which the cooling process 73 is not carried out. Furthermore, the cooling process 73 can elevate the water vapor consistency X (solid line) to more than the water vapor consistency X (two-dot chain line) in a case in which the cooling process 73 is not carried out (refer to FIG. 9). As such, the cooling process 73 can suppress lowering of the water vapor consistency X in the base layer 10s.

Therefore, according to the present invention, since the cooling process 73 for cooling the hard coating layer 10h is carried out so as to suppress the lowering of the water vapor consistency X, which is caused by the first phase transition process 71, degradation of the absorption efficiency of the water vapor 56 can be suppressed. As such, according to the present invention, the first phase transition process 71 is carried out within a short time, and the curling can be corrected with a short time.

In a case in which improvement of the absorption efficiency of the water vapor is intended, the starting time tx of the cooling process 73 is not particularly limited as long as the starting time tx is after the time t1 and before the time t2, but is preferably in the period where the base layer 10s is in the rubber state, that is, in the range of Tg<Tf1 in FIG. 8. Meanwhile, the cooling process 73 may be started earlier than the first phase transition process 71 in order to suppress an abrupt increase in the temperature Tf1 during the first phase transition process 71. Meanwhile, the finishing times of the cooling process 73 may be the same as the time t2 or before the time t2.

In addition, the cooling of the hard coating layer 10h is preferably carried out while the hard coating layer is in contact with the water vapor so that the value of |Tf1−Tg| is decreased in the first phase transition process 71. In a case in which the cooling process 73 is carried out on the base layer 10s in the glass state, it is preferable to carry out the process so that the phase transition from the glass state to the rubber state is not delayed. In a case in which the cooling process 73 is carried out on the base layer 10s in the rubber state, the hard coating layer 10h may be cooled so that the temperature Tf1 stays above the glass transition temperature Tg, and the hard coating layer 10h is preferably cooled so that the temperature Tf1 approaches the glass transition temperature Tg. When the cooling process 73 decreases the temperature Tf1 of the base layer 10s in the rubber state to below the glass transition temperature Tg, the base layer 10s cannot be maintained in the rubber state. As a result, it becomes difficult to generate a second internal stress of a sufficient intensity. Therefore, it is preferable from the standpoint of energy use efficiency and curling-correcting capacity to cool the hard coating layer 10h so that the base layer 10s does not turn into the glass state from the rubber state while the water vapor 56 is brought into contact with the base layer 10s. Furthermore, the cooling of the hard coating layer 10h is preferably carried out so that dew condensation does not occur. For example, the difference between the temperature of the cooling gas 60 and the temperature of the water vapor 54 is preferably 50° C. or lower.

In the cooling process 73, the value of the water vapor consistency X is preferably 0.8 to 4.4, and more preferably 2.5 to 4.0.

Meanwhile, the cooling process 73 is carried out while the first phase transition process 71 is carried out in the embodiment, but the present invention is not limited thereto, and a post cooling process may be added. The post cooling process is carried out while the second phase transition process is carried out, and cools the hard coating layer 10h in order to increase the degree of shrinkage. The post cooling process can generate a larger second internal stress.

In the embodiment, the water vapor 56 is blown against both end portions in the width direction of the base layer 10s, and the cooling gas 60 is blown against the both end portions in the width direction of the hard coating layer 10h, but the present invention is not limited thereto. For example, the entire area in the width direction of the base layer 10s may be exposed to the water vapor 56. In this case, the portions exposed to the cooling gas 60 may be only both end portions in the width direction or the entire area in the width direction of the hard coating layer 10h.

Meanwhile, it is preferable that at least both end portions in the width direction of the base layer 10s be exposed to the water vapor 56, and both end portions in the width direction of the hard coating layer 10h be exposed to the cooling gas 60. This is because, as long as curling of at least both end portions in the width direction of the laminated film 10 is corrected, the laminated film 10 can be transported without being brought into contact with the casing or the like in a case in which the laminated film 10 is passed through an slit-shaped opening provided in the casing and the like.

In the embodiment, the cooling gas-supplying unit 53 is used to blow the cooling gas 60 against the base layer 10s for cooling of the base layer 10s in the cooling process 73, but the present invention is not limited thereto, and cooling rollers may be used to cool the base layer 10s instead of the cooling air-supplying unit 53. Hereinafter, the water vapor contact casing in a case in which the cooling process is carried out using the cooling rollers will be described, but the same apparatuses, parts, and the like as in the above embodiment will be given the same reference number, the details thereof will not be described, and only the different aspects from the above embodiment will be described.

Figure 10:
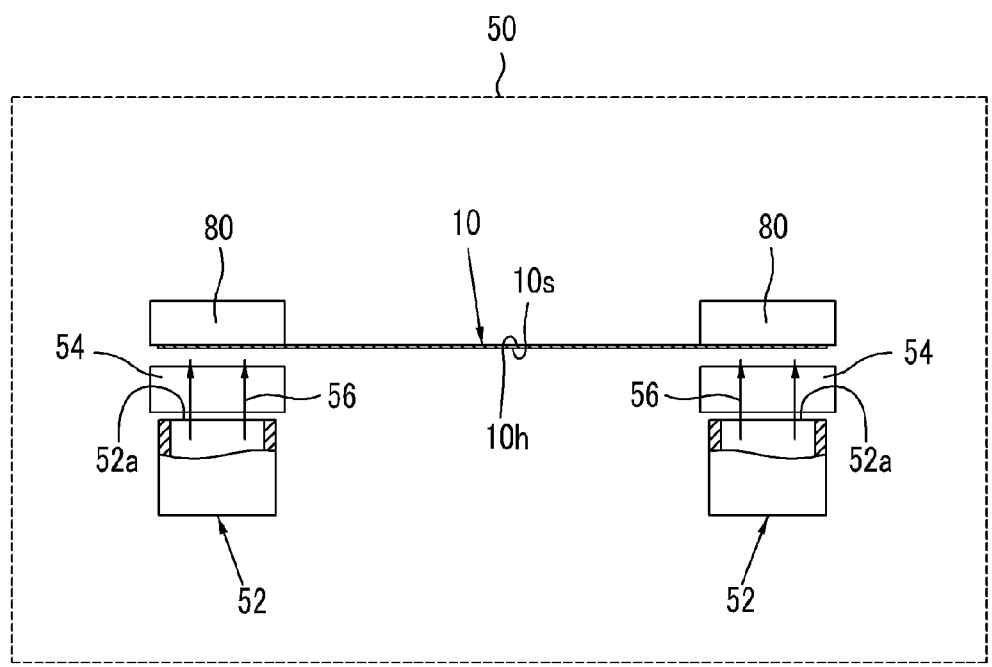
FIG. 10 is a cross-sectional view showing the outline of the second curling correction apparatus.

As shown in FIG. 10, cooling rolls 80 are disposed in the water vapor contact casing 50. The cooling rolls 80 are disposed at both ends in the width direction of the transportation path 26. The cooling roll 80 is provided with a roll temperature-adjusting apparatus. The roll temperature-adjusting apparatus preferably has a jacket capable of circulating a heat transfer medium (water, oil, and the like), a temperature-adjuster for adjusting the temperature of the heat transfer medium under the control of the control section 65, and a circulator for circulating the heat transfer medium between the jacket and the temperature-adjuster.

Since the cooling rolls 80 are disposed at both ends in the width direction of the transportation path 26, the cooling rolls 80 support both end portions in the width direction of the base layer 10s in the laminated film 10 when the laminated film 10 is transported through the transportation path 26. Both end portions in the width direction of the base layer 10s can be cooled by being supported by the cooling rolls 80.

The temperature TR of the cooling roll 80 is lower than the temperature Tf1, and is lower than the temperature TB of the water vapor 56. In addition, the value of (TB−TR) is preferably larger than 0° C. to 50° C.

In the embodiment, the cooling rolls 80 are disposed only at both ends in the width direction of the transportation path 26, but the cooling rolls 80 may be disposed across the entire area in the width direction. The base layer 10s can be cooled across the entire area in the width direction using the cooling rolls 80 that can support the entire area in the width direction.

Meanwhile, both the cooling rolls 80 and the cooling gas-supplying unit 53 may be used together.

Any of contact cooling in which the base layer 10s is cooled using the cooling rollers and non-contact cooling in which the base layer 10s is cooled using a cooling gas can be used as the cooling method of the base layer 10s in the cooling process 73. However, in the case of the contact cooling, an adverse effect of deformation of the laminated film 10 due to the contact of the base layer 10s with the cooling rollers or occurrence of wrinkles in the laminated film 10 can be considered. Considering the problem of deformation or wrinkles, the non-contact cooling is preferred as the cooling method of the base layer 10s in the cooling process 73.

Figure 11:
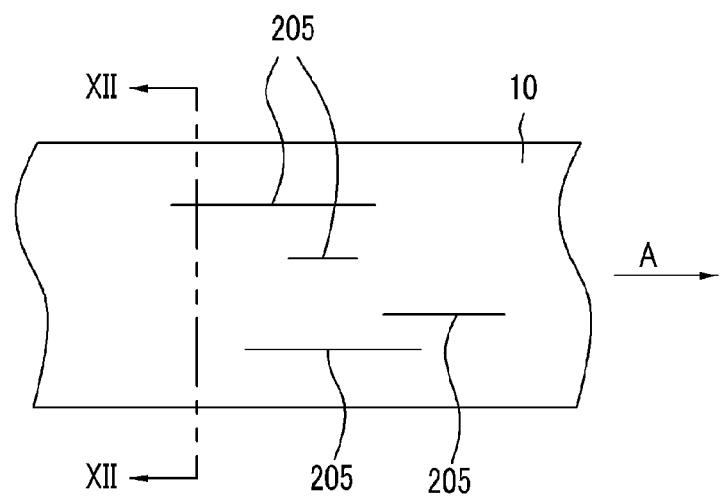
FIG. 11 is a plan view showing the outline of wrinkles.
Figure 12:
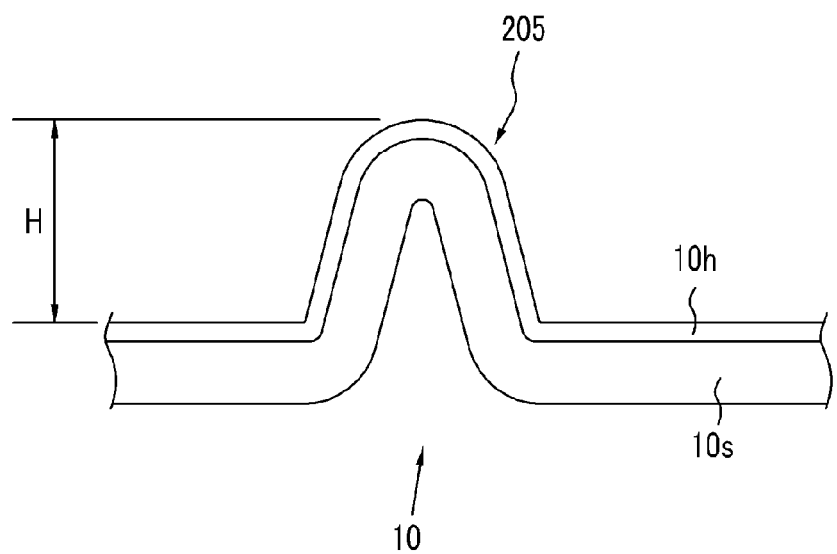
FIG. 12 is a cross-sectional view taken along the line XII-XII, showing the outline of wrinkles.

As shown in FIGS. 11 and 12, the wrinkles 205 are formed so as to protrude from the surface of the laminated film 10 and extend in the transportation direction A of the laminated film 10. Sometimes, the wrinkles 205 reach a height of about 1 mm. Portions having the wrinkles 205 generated therein cannot be used as products.

The process of wrinkle generation is estimated as follows:
(Process 1 of Wrinkle Generation)
Due to the friction force with the circumferential surface of the web handling rollers 27, it is difficult for portions that come into contact with the web handling rollers 27 of the base layer 10s to swell in the width direction. Therefore, when swelling occurs at the corresponding portions, the corresponding portions swell in the thickness direction, and therefore the laminated film 10 is folded so as to rise with respect to the circumferential surface of the web handling rollers 27. In this manner, the wrinkles 205 are generated in the laminated film 10.

(Process 2 of Wrinkle Generation)
In a case in which the laminated film 10 is transported using the web handling rollers 27 having a temperature lower (for example, 20° C. to 30° C. lower) than the temperature of the base layer 10s, shrinkage occurs in the base layer 10s that comes into contact with the transportation rolls 27. The shrinkage of the base layer 10s caused by the contact with the web handling rollers 27 causes the width of the laminated film 10 to differ at the portions on the upper stream side and the lower stream side of the web handling rollers in the transportation direction. This width difference generates an internal stress, and therefore the wrinkles 205 are generated in the laminated film 10.

(Process 3 of Wrinkle Generation)
When the phase transition from the rubber state into the glass state occurs at a part of the base layer 10s, the phase transition causes shrinkage of the base layer 10s. In addition, when the base layer 10s in a shrunk state comes into contact with the web handling rollers 27, similarly, the wrinkles 205 are generated in the laminated film 10.

In the above embodiment, water vapor is used to correct curling of the laminated film, but the present invention is not limited to water vapor, and any vapor may be used. The vapor is the vapor of a substance that can soften the base film 22, and, more specifically, the vapor of a substance that can lower the glass transition temperature Tg of the substance that composes the base film 22. The substance may be any of methylene chloride, water, an organic solvent, a mixture of water and an organic solvent, and a mixture of two or more organic solvents. The organic solvent includes dichloromethane, methyl acetate, acetone, and the like.

In the above embodiment, the coating fluid including an ultraviolet-curable material and a solvent is used, but the present invention is not limited thereto, and a coating fluid including an electron ray-curable material and a solvent may be used instead of the coating fluid including an ultraviolet-curable material and a solvent. In this case, electron rays may be irradiated instead of ultraviolet rays.

In the above embodiment, curling occurring in the double layer-structured laminated film 10 are corrected, but the present invention is not limited thereto. When the film can absorb the substance that forms vapor, curling occurring in the film can be corrected regardless of the number of layers, and the presence or absence of a layer structure.

(Cellulose Acylates)

A particularly preferred cellulose acylate is triacetyl cellulose (TAC). In addition, among cellulose acylates, cellulose acylates in which the fraction of the hydroxyl groups of cellulose which are esterified by carboxylic acids, that is, the substitution degree of acyl groups satisfies all of the following formulae (I) to (III). Meanwhile, in the following formulae (I) to (III), A and B represent the substitution degree of acyl groups, A is the substitution degree of acetyl groups, and B is the substitution degree of acyl groups having 3 to 22 carbon atoms. Meanwhile, 90% by mass or more of TAC preferably contains particles of 0.1 mm to 4 mm.

$$2.5 \leq A+B \leq 3.0 \tag{I}$$

$$0 \leq A \leq 3.0 \tag{II}$$

$$0 \leq B \leq 2.9 \tag{III}$$

The glucose unit with a β-1, 4 bond, which composes cellulose, has free hydroxyl groups at the second, third, and sixth coordination sites. A cellulose acylate is a polymer in which part or all of the hydroxyl groups are esterified by acyl groups having 2 or more carbon atoms. The acyl substitution degree refers to the fraction of esterified hydroxyl groups of cellulose (100% esterification has a substitution degree of 1) at each of the second, third, and sixth coordination sites.

The total acylation substation degree, that is, DS2+DS3+DS6 is preferably 2.00 to 3.00, more preferably 2.22 to 2.90, and particularly preferably 2.40 to 2.88. In addition, DS6/(DS2+DS3+DS6) is preferably 0.28 or more, more preferably 0.30 or more, and particularly preferably 0.31 to 0.34. Here, DS2 refers to the substitution degree of the hydroxyl group at the second coordination site of the glucose unit by an acyl group (hereinafter referred to also as the "acyl substitution degree at the second coordination site"), DS3 refers to the substitution degree of the hydroxyl group at the third coordination site of the glucose unit by an acyl group (hereinafter referred to also as the "acyl substitution degree at the third coordination site"), and DS6 refers to the substitution degree of the hydroxyl group at the sixth coordination site of the glucose unit by an acyl group (hereinafter also referred to as the "acyl substitution degree at the sixth coordination site").

Only one kind of acyl group or two or more kinds of acyl groups may be used in the cellulose acylate of the present invention. When two or more kinds of acyl groups are used, one is preferably an acetyl group. When the total of the substitution degrees by the hydroxyl groups at the second, third, and sixth coordination sites is indicated by DSA, and the total of the substitution degrees by the acyl groups other than the acetyl groups of the hydroxyl groups at the second, third, and sixth coordination sites is indicated by DSB, the value of DSA+DSB is more preferably 2.22 to 2.90, and particularly preferably 2.40 to 2.88. In addition, DSB is 0.30 or more, and particularly preferably 0.7 or more. Furthermore, 20% or more of DSB is the substituent of the hydroxyl group at the sixth coordination site, but the substituent of the hydroxyl group at the sixth coordination site is more preferably 25% or more, still more preferably 30% or more, and particularly preferably 33% or more. In addition, furthermore, cellulose acylates having a substitution degree at the sixth coordination site of 0.75 or more, furthermore, 0.80 or more, and particularly 0.85 or more can also be included. A solution (dope) having a preferred solubility can be manufactured using these cellulose acylates. Particularly, favorable solutions can be manufactured in non-chlorine-based organic solvents. Furthermore, solutions having a low viscosity and favorable filtering properties can be manufactured.

Cellulose, which is a raw material of the cellulose acylate, may be obtained from either linter or pulp.

The acyl group having two or more carbon atoms of the cellulose acylate of the present invention may be an aliphatic group or an aryl group, and is not particularly limited. Examples thereof include alkyl carbonyl ester, alkenyl carbonyl ester, aromatic carbonyl ester, aromatic alkyl carbonyl ester, and the like of cellulose, and, each may further have a substituted group. Preferred examples thereof include propionyl, butanoyl, pentanoyl, hexanoyl, octanoyl, decanoyl, dodecanoyl, tridecanoyl, tetradecanoyl, hexadecanoyl, octadecanoyl, iso-butanoyl, t-butanoyl, cyclohexane carbonyl, oleoyl, benzoyl, naphthyl carbonyl, cinnamoyl group, and the like. Among them, propionyl, butanoyl, dodecanoyl, octadecanoyl, t-butanoyl, oleoyl, benzoyl, naphthyl carbonyl, cinnamoyl, and the like are preferred, and propionyl, and butanoyl are particularly preferred.

EXAMPLES

Preparation of the Coating Fluid for the Hard Coating Layer

The following composition was fed into a mixing tank, stirred, and then filtered using a polypropylene filter having a hole diameter of 0.4 μm, thereby obtaining a coating fluid for the hard coating layer.

| | |
|---|---|
| Methyl ethyl ketone | 900 parts by mass |
| Cyclohexanone | 100 parts by mass |
| Partial caprolactone-modified multifunctional acylate (DPCA-20, manufactured by Nippon Kayaku Co., Ltd.) | 750 parts by mass |
| Silica sol (MIBK ST, manufactured by Nissan Chemical Industries, Ltd.) | 200 parts by mass |
| Polymerization initiator (IRGACURE 184, manufactured by Ciba Specialty Chemicals Inc.) | 50 parts by mass |

The coating fluid for the hard coating layer was coated on a triacetyl cellulose (TAC) film (TD80UF, manufactured by Fujifilm Corporation, refraction index 1.48, thickness 80 μm) as a transparent base material using a Gravure coater. After a coated membrane formed by the coating was dried at 100° C., the coated membrane was cured by irradiating ultraviolet rays having an illuminance of 400 mW/cm$^2$ and an irradiance of 150 mJ/cm$^2$ using a 160 W/cm air-cooling metal halide lamp (manufactured by Eye Graphics Co., Ltd.) while nitrogen purging was carried out so that the atmosphere had an oxygen concentration of 1.0 vol. % or less, thereby forming a 9 μm-thick hard coating layer on the TAC film. In this manner, a laminated film having the hard coating layer provided on the TAC film was obtained. The laminated film was curled so that the hard coating layer was on the inside. The curvature C0 of the curl in the laminated film at this time was 20.9 m$^{-1}$.

Figure 13:
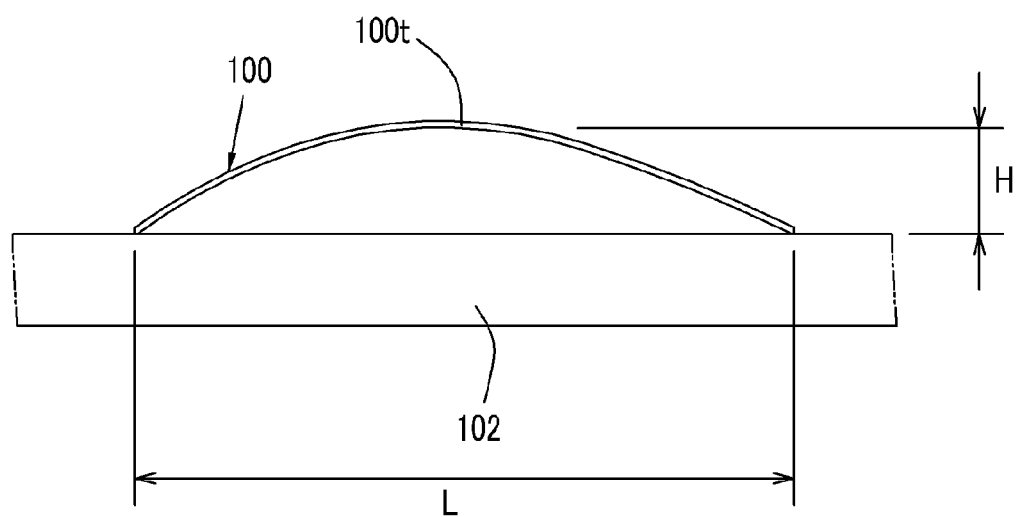
FIG. 13 is a side view showing the outline of the length L and height H of the measurement film, which are necessary to compute the curvature of the curl.

The curvature of the curl in the laminated film was measured as follows: A slit-shaped film having a length in the longitudinal direction of 5 mm was cut out from the laminated film. Furthermore, the slit-shaped film was cut at an interval of 150 mm in the width direction of the laminated film, and a plurality of measurement films 100 (with a vertical length of 5 mm and a horizontal length of 150 mm) was obtained. As shown in FIG. 13, the measurement film 100 was disposed on a flat table 102 so that the hard coating layer faced downward. The length L of a line segment that combines both ends of the measurement film 100 in the horizontal direction and the height H from the table 102 through the highest location 100t in the measurement film 100 were measured. In addition, the curvature of the curl in the measurement film 100 in the width direction of the laminated film was computed from the length L and the height H.

(Test 1)

A preheating process, the first phase transition process, and the second phase transition process were carried out sequentially on the laminated film having curling with the curvature C0. In addition, the cooling process was not carried out. During the preheating process, the laminated film was exposed to preheating wind, and the temperature of the laminated film was set to 76° C. During the first phase transition process, gas including water vapor (with a temperature T of 110° C. and an absolute humidity AH of 550 g/m$^3$) was brought into contact with the TAC film side of the laminated film in the water vapor contact casing 50. The time period necessary for the first phase transition process was 1.8 seconds. The first phase transition process lowered the glass transition temperature of the TAC film to 80° C. Meanwhile, the glass transition temperature was measured using a differential scanning calorimeter (DSC), manufactured by Seiko Instruments Inc., under conditions of a temperature increase rate of 10° C./minute and a water vapor saturated atmosphere as the measurement atmosphere. In addition, the temperature Tfx of the laminated film was 105° C. at the end of the first phase transition process.

(Tests 2 and 3)

The curling in the laminated films was corrected in the same manner as in Test 1 except that the cooling process was carried out while the first phase transition process was carried out. During the cooling process, the cooling gas was exposed to the hard coating layer side of the laminated film. The temperature Ta of the cooling gas that was used in the cooling process and the temperature Tfx of the laminated film at the end of the first phase transition process were as shown in Table 1.

TABLE 1

|  | Ta (° C.) | Tfx (° C.) | C1 (m$^{-1}$) |
|---|---|---|---|
| Test 1 | — | 105 | 7.5 |
| Test 2 | 80 | 90 | 3.7 |
| Test 3 | 70 | 85 | 2.3 |

The curvatures C1 of the curls were measured by the above method in the laminated films that had undergone the first phase transition process and the second phase transition process in Tests 1 to 3. The measured values of the curvatures C1 of the curls were as shown in Table 1.

It can be confirmed that the curl curvatures were small, that is, the curling-correcting capacities were improved in Tests 2 and 3 in which the cooling process was carried out while the first phase transition process was carried out in comparison to Test 1 in which the cooling process was not carried out. In addition, as shown in the temperature Tfx of the laminated film at the end of the first phase transition process, it can be told that the cooling process is carried out to suppress an increase of the temperature of the laminated film due to the contact with water vapor. As such, it is considered that the cooling process that is carried out while the first phase transition process is carried out suppresses the lowering of the water vapor consistency X and accelerates the absorption of water vapor in the laminated film, and therefore the second internal stress that can offset the original curl is increased.

What is claimed is:

1. A method for correcting curling of a film, comprising:
   a first phase transition process in which water vapor having a higher temperature than an outside surface of the film is brought into contact with the outside surface of the film until an outer layer in a glass state, which is exposed to the outside surface of the film in a curled state, is turned into a rubber state,
   a second phase transition process in which the contact of the water vapor is stopped until the outer layer in the rubber state is turned into a glass state, and
   a cooling process in which an inside surface of the curled film is cooled while the first phase transition process is carried out.

2. The method for correcting curling of a film according to claim 1,
   wherein the cooling process is carried out so as to suppress a lowering of the vapor concentration as indicated by Va/Vs when the temperature of the base material is Tf1, wherein the amount of water vapor included in an atmosphere per unit volume in the vicinity of the outside surface of the film having a temperature of the base material of Tf1 is Va, and the amount of saturated water vapor having a temperature of Tf1 in an atmosphere per unit volume is Vs.

3. The method for correcting curling of a film according to claim 1,
   wherein the cooling is carried out so that |Tf1−Tg| in the first phase transition process is decreased when the glass transition temperature of a substance that composes the outer layer is Tg, and the temperature of the base material is Tf1.

4. The method for correcting curling of a film according to claim 1,
   wherein the cooling is carried out in a state in which the outer layer is in a rubber state.

5. The method for correcting curling of a film according to claim 1,
   wherein the cooling is carried out by blowing a gas having a temperature lower than the temperature Tf1 against the inside surface.

6. The method for correcting curling of a film according to claim 1,
   wherein the cooling is carried out by bringing rollers having a temperature lower than the temperature Tf1 into contact with the inside surface.

7. The method for correcting curling of a film according to claim 1,
   wherein the film is in a web shape,
   the film is curled in the width direction, and
   the cooling is carried out against the end portions in the width direction of the web.

8. The method for correcting curling of a film according to claim 1,
   wherein the film is formed of a material that can absorb the substance that composes the water vapor.

9. A method of manufacturing a laminated film, comprising:
   a membrane-forming process in which a membrane composed of monomers is formed onto a film,
   a polymerization process in which polymerized membranes are overlapped on the film by polymerization of the monomers so as to obtain a laminated film, and
   a curling correcting process in which curling occurring in the laminated film due to the polymerization process is corrected, in which the method for correcting curling of a film according to claim 1 is carried out in the curling correcting process.

* * * * *